United States Patent [19]

Hansen

[11] Patent Number: 5,771,659
[45] Date of Patent: Jun. 30, 1998

[54] APPARATUS TO WELD A WRAPPING SHEET TO THE CORE OF A WARPPED ROLL-LIKE ARTICLE

[75] Inventor: Niels Henrik V. Hansen, Sabro, Denmark

[73] Assignee: Campen A/S, Aarhus V, Denmark

[21] Appl. No.: 737,366

[22] PCT Filed: May 11, 1995

[86] PCT No.: PCT/DK95/00187

§ 371 Date: Nov. 12, 1996

§ 102(e) Date: Nov. 12, 1996

[87] PCT Pub. No.: WO95/31373

PCT Pub. Date: Nov. 23, 1995

[30] Foreign Application Priority Data

May 13, 1994 [DK] Denmark .................................. 0548/94

[51] Int. Cl.⁶ ........................... B65B 51/10; B65B 25/14; B65B 51/22
[52] U.S. Cl. .......................... 53/370.7; 53/370; 53/370.4; 156/184; 156/187
[58] Field of Search ........................ 53/211, 370, 370.2, 53/370.4, 370.7, 370.6, 389.2, DIG. 2; 408/1 R, 82; 156/184, 187, 443, 446; 493/271, 291, 327

[56] References Cited

U.S. PATENT DOCUMENTS

| | | | |
|---|---|---|---|
| 3,875,723 | 4/1975 | Sundin | 53/389.2 |
| 4,517,790 | 5/1985 | Kreager | 53/DIG. 2 |
| 4,534,151 | 8/1985 | Schneck et al. | 53/211 |
| 4,716,709 | 1/1988 | Lamb, Sr. et al. | 53/389.2 |
| 4,933,041 | 6/1990 | Wildmoser | 156/443 |
| 5,013,193 | 5/1991 | Rabo et al. | 408/82 |
| 5,016,430 | 5/1991 | Itoh et al. | 53/370.2 |
| 5,058,360 | 10/1991 | Yamazaki et al. | 53/DIG. 2 |
| 5,071,501 | 12/1991 | Doi et al. | 156/187 |

FOREIGN PATENT DOCUMENTS

| | | | |
|---|---|---|---|
| 0640415 | 2/1994 | Japan | 53/370.4 |
| 2043021 | 10/1980 | United Kingdom | 53/211 |

*Primary Examiner*—James F. Coan
*Assistant Examiner*—Gene L. Kim
*Attorney, Agent, or Firm*—Watson Cole Stevens Davis, P.L.L.C.

[57] ABSTRACT

An apparatus for attaching a plastic wrapping sheet to a composite product formed of a plastic core tube having a web-shaped material wrapped therearound, the plastic wrapping sheet surrounding the composite product so that an end portion extends beyond an end of the composite product, the apparatus including twin closing yokes which are movable towards one another to gather the end portion together, a cylindrical welding head for welding the gathered end portion to the end of the core tube, and a rotatable cutting bead for removing free excess plastic wrapping sheet from within the core tube.

11 Claims, 3 Drawing Sheets

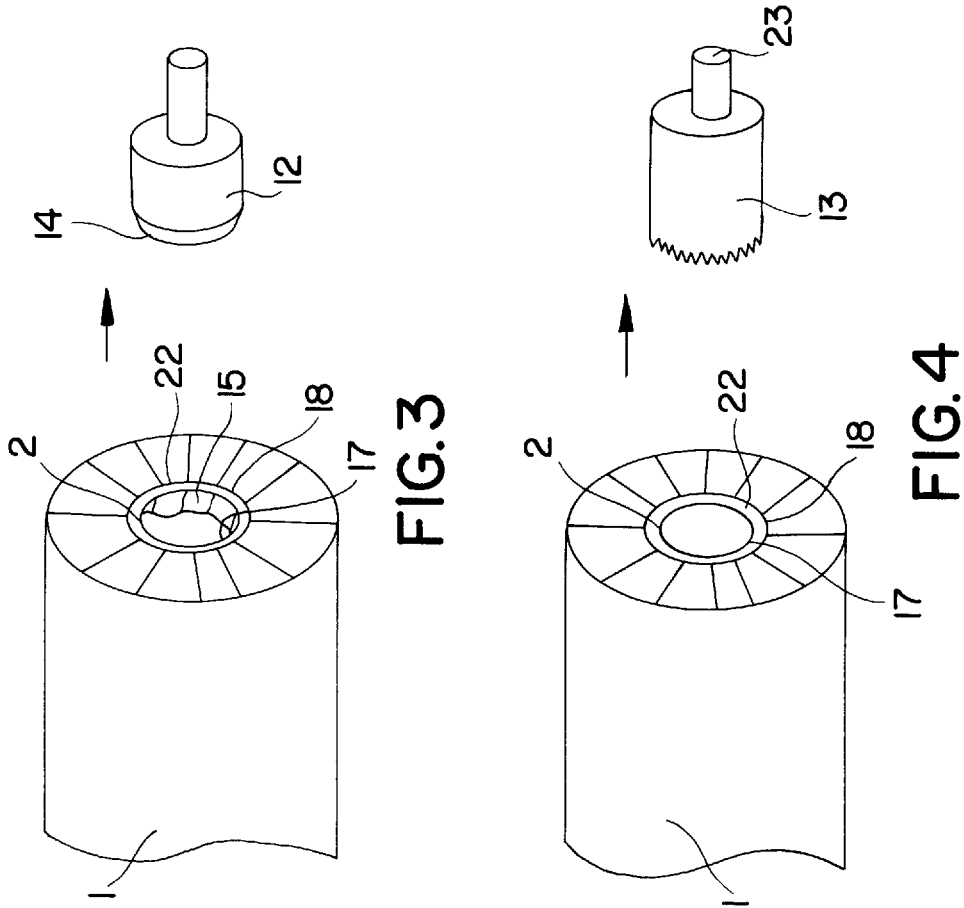
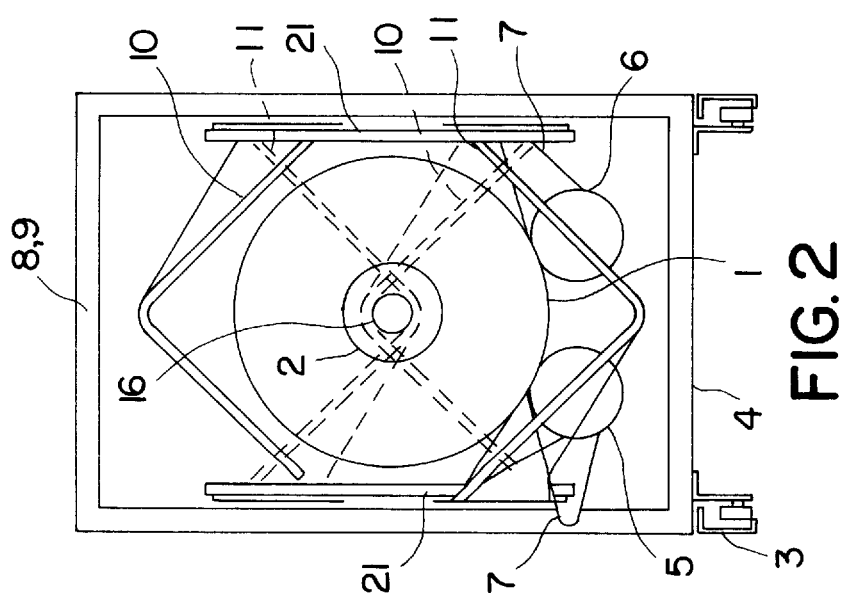

APPARATUS TO WELD A WRAPPING SHEET TO THE CORE OF A WARPPED ROLL-LIKE ARTICLE

BACKGROUND OF THE INVENTION

1. Field of the Invention

The present invention concerns an apparatus for use in plastics sheet wrapping of web-shaped material rolled up on a plastics-containing core tube having substantially the same length as the width of the web-shaped material, the apparatus including closing parts which are adapted to grip and gather the excess plastics sheet parts which extend beyond the rolled-up web-shaped material at at least one end.

2. The Prior Art

Owing to considerations of space and to facilitate handling of the web-shaped material, core tubes having substantially the same length as the width of the rolled-up web-shaped material are used today. So far, the end closing of the plastics sheet package around the web-shaped material has been made manually in practice by taping, plugging and subsequent fixing with staples, respectively, interiorly in the core tube. These methods are difficult and cumbersome to perform and provide no real certainty that the package will be hermetically tight. The consequence is therefore frequently transport damage, in particular in case of wrapped web-shaped material, such as carpet materials which are placed in their full length on the platform of a truck, where dirt and water are sucked up at the tailboard during driving. A tight end closure is therefore absolutely necessary. Heavy web-shaped materials, such as carpet materials, where a roll can weigh up to 600 to 700kg, also make particularly great requirements with respect to a strong end closure which remains tight with certainty during transport and handling, where the tube frequently "sinks" into the material and thus subjects the end closure to a great load.

GB 2 043 021 discloses an apparatus of the type mentioned in the opening paragraph. However, in this apparatus it is a requirement that the core tube is considerably longer than the width of the rolled-up, web-shaped material for the provision of an asserted tight end closure by heat fusion. However, the apparatus cannot be used commercially in practice owing to the protruding core tube which occupies unacceptably much space during storage and transport.

Thus, so far it has not been possible to obtain both a tight package, which is important to avoid ingress of dust, dirt and moisture, in particular during transport on the platform of trucks, and a wrapping method which leaves the interior of the tube freely accessible for fork-lift trucks having rods in connection with wrapping of rolled-up, web-shaped material on core tubes which have substantially the same length as the width of the web-shaped material.

Finally, it should be mentioned that the manual closing does not enable direct recycling owing to the different materials materials used (tape, plug and staples.

SUMMARY OF THE INVENTION

The apparatus of the present invention is characterized in that it includes welding means which are adapted to weld gathered plastics sheet material parts along the annular end face on the adjacent end of the core tube. This ensures that a tight and strong package is provided with certainty, while the interior of the tube is freely accessible to carpet rods, forks on fork-lift trucks, etc.

In use, the closing parts of the apparatus are joined around the excess plastics sheet parts which are subsequently kept together at the end of the core tube with or without engagement of the closing parts. The welding head is then driven forwards, and the plastics sheet parts are welded to the end face of the core tube.

The invention can provide the advantage that the tube appears without excess plastics sheet parts, while a neat end closure is obtained.

The invention may be used to special advantage when both core tube and package are made of the same plastics material, e.g., polyethylene, which simplifies the recycling process considerably.

BRIEF DESCRIPTION OF THE DRAWING

The invention will be explained more fully below with reference to the drawing, in which FIG. 2 is an end view of the same, FIG. 3 is a partially sectional, enlarged view of the plastics sheet wrapped, rolled-up, web-shaped material after welding on the end face of the core tube, with the ultrasound head of the apparatus being moved away, FIG. 4 is a view of the same after welding on the end face of the core tube, with the cutting head of the apparatus being moved away.

DETAILED DESCRIPTION OF THE PREFERRED EMBODIMENT

Figure 1:
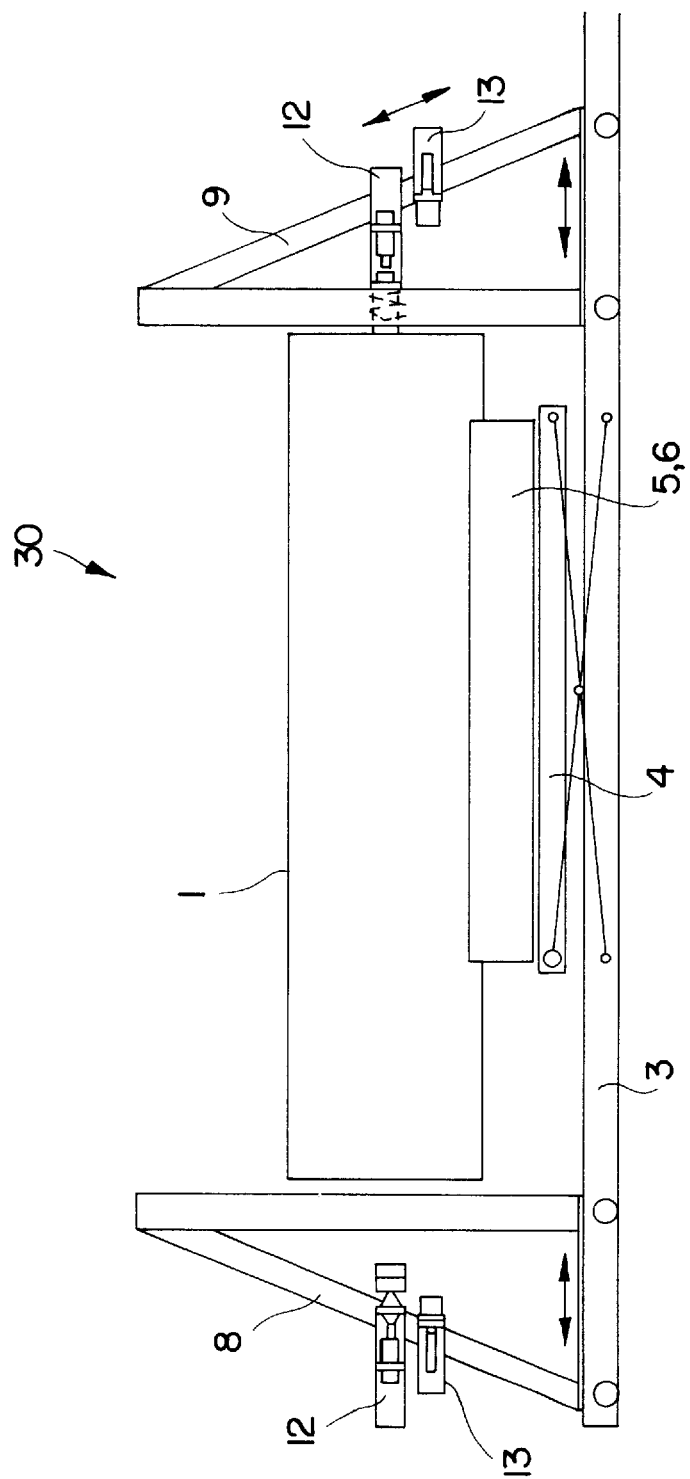
FIG. 1 is a lateral view of an apparatus according to the invention containing a web-shaped material, such as a carpet, rolled up on a core tube.

The apparatus 30 shown in FIG. 1 for use in plastics sheet wrapping of rolled-up, web-shaped material 1 on a core tube 2 comprises a frame 3 on which a vertically slidable lifting table 4 containing two rollers 5, 6 is mounted. The rollers 5,6 are rotatable by means of a motor (not shown). The rollers 5, 6 moreover comprise holding arms 7 which are used for guiding the web-shaped material 1 into position and during tipping of the web-shaped material 1. The holding arms are shown in different positions in FIG. 2.

The frame 3 moreover mounts two horizontally slidable carriages 8, 9, on each of which two V-shaped closing yokes 10, 11, a welding head 12 and a cutting head 13 are mounted.

The closing yokes 10, 11 are movable vertically in slide guides 21 so that, seen from the end, they form an opening in the shape of a parallelogram 16 whose area may be made larger or smaller by moving the closing yokes 10, 11 toward or away from each other. In FIG. 2, the closing yokes 10, 11 are shown in the open position in solid line and in the closed position in broken line.

The ultrasonic welding head 12, which is shown in FIG. 3, is cylindrical with a circular cross-section and has an obliquely bevelled engagement face 14, which is adapted to engage the plastics sheet material along the internal 17 or external 18 annular edge of the core tube at the end face 22 of the core tube during welding. The welding head is slidable vertically. In addition, it is movable horizontally so that it may be moved toward and away from the core tube.

Figure 5:
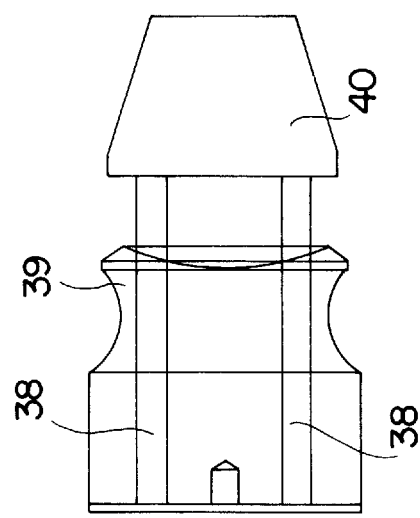
FIG. 5 is a sectional view of an ultrasound head with a cone mounted in front.

FIG. 5 shows an embodiment in which a cone 40 is mounted in front of the ultrasonic welding head 39, and this cone 40 positions the welding head with respect to the core tube 2 when the cone is driven into the core tube 2. The cone 40 may be mounted such that it can slide with respect to the welding head 12 via guides 38. Hereby, after positioning, it is possible to advance the welding head 12 in a direction toward the core tube 2, while the cone 40 is kept stationary within the core tube.

Like the welding heads 12, the cutting means 13 may be moved vertically as well as horizontally. Further, the cutting means may be moved around the end edge of the core tube. In a particularly expedient embodiment, as shown in FIG. 4, the cutting means may be shaped as a turning saw 13 for cutting off excess, free plastics sheet material within the core tube after welding. The cutting means may also be provided as a cutting/milling head or knives which cut off the free plastics sheet material directly around the end face 22 of the core tube.

Figure 6:
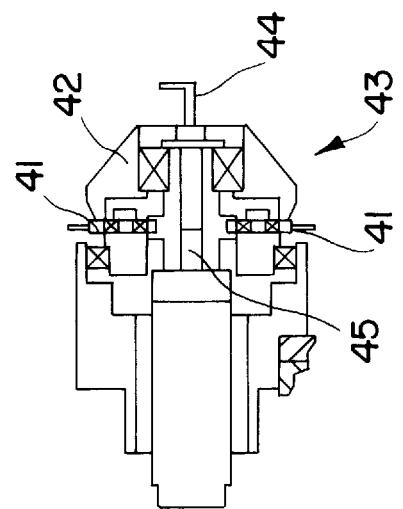
FIG. 6 is a lateral view of knives for severing.

It is shown in FIG. 6 how two knives 41 are mounted behind a cone 42 which positions the knife device with respect to the core tube 2. The knife device 43 is constructed such that the knives 41 are moved radially outwards when the shaft 45 of a motor (not shown) rotates in one direction of rotation, and radially inwards when the shaft 45 rotates in the other direction of rotation.

For the shown closing of the end on the plastics sheet wrapped, rolled-up, web-shaped material, the roll 1 is placed on the rollers 5, 6 and is guided into position via the holding arms 6, 7. Then the lifting table 4 is raised/lowered to position the core tube 2 of the roll in alignment with the welding heads 12 via laser equipment (not shown). Then the carriages 8, 9 are run inwards toward their respective sides of the roll.

The rollers 5, 6 are subsequently caused to rotate, whereby also the roll 1 rotates. Simultaneously, the closing yokes 10, 11 are moved together around the excess plastics sheet parts at the ends, the closing yokes retaining the plastics sheet parts during continued rotation of the roll. In other embodiments (not shown), the closing yokes 10, 11 and thereby the excess plastics sheet parts can be rotated so that the plastics sheet parts are kept together twisted in a desired manner after the closing yokes have moved away.

Then the twisted plastics sheet parts are welded together by means of welding equipment (not shown), and the excess plastics sheet parts are removed.

Then the welding heads 12 are advanced and urge the plastics sheet parts twisted and welded together into the ends of the core tube 2, and the plastics sheet is is welded by means of ultrasound to the annular inwardly facing edge area 17 on the end face of the core tube 2.

Welding takes place in that the welding head 12, which is substantially in the shape of a truncated cone, is caused to oscillate with high-frequency oscillations, preferably 10 to 40 kHz, whereby the plastics sheet is welded to the end face of the core tube, see FIGS. 3 and 4. After welding, a complete plastics sheet weld will be provided on the end face. In connection with wrapping of carpet material the core tube normally has an outer diameter of 110 mm, and the dimensions of the mandrel 12 therefore correspond to this.

Then the welding heads 12 return, and the turning saw 13 is passed into the core tube 2 and cuts off the excess plastics sheet parts.

When the knives 41 are to be used, the knife device 43 is inserted into the core tube 2, while the knives 41 are displaced radially inwards. The motor is then caused to rotate in one direction of rotation, and the knives 41 will be displaced radially outwards and simultaneously cut off excess, free plastics sheet material within the core tube 2. After cutting, the motor is caused to rotate the shaft 45 in the other direction of rotation, and the knives 41 will therefore be displaced radially inwards so that the knife device 43 can then be moved out of the core tube 2.

A hook device 43 may be placed in front of the knife device 43, the hook device carrying along the excess plastics sheet material when the knife device 43 is moved out of the core tube.

Finally, the excess plastics material is sucked away via a central opening 23 in the turning saw 13, which then returns. Lastly, the carriages 8, 9 return, and the lifting table 4 is run to the starting position, following which the roll 1 is tipped out of the apparatus during rotation of the holding arms 7.

FIG. 4 shows another embodiment of the wrapping. In this case, the weld 18 is made on the outer edge 1B of the end face 22 of the core tube, and the cutting head 13 is being moved away from the core tube 2.

Most frequently, the core tube 2 comprises a plastics tube, but in other embodiments it may be formed by, e.g., a cardboard tube having an inner plastics coat or a cardboard tube having a plastics bushing at the end.

Many modifications are possible without departing from the actual idea of the invention. In the embodiment shown, the closing yokes are V-shaped. However, also more than two closing yokes shaped as, e.g., straight lines or curves are conceivable.

I claim:

1. An apparatus for attaching a plastic sheet to a composite product formed of an elongated core tube comprised of a plastic material and a web-shaped material wrapped around the elongated core tube, said core tube having a length which is substantially equal to a width of the web-shaped material and defining first and second ends in substantial alignment with respective opposite first and second side edges of the web-shaped material, the plastic sheet including a first end portion which extends beyond the first end of the core tube and first side edge of the web-shaped material, said apparatus comprising closing means for gripping and gathering the first end portion of the plastic sheet, welding means for welding said gathered first end portion of said plastic sheet to said first end of said core tube, said welding means including a welding head having an engagement face for engaging the plastic sheet material along one of an inner and outer annular edge of the first end of the core tube and cutting means comprising a milling head mounted to be axially slidable in an inward direction toward an interior of the core tube for removing free excess plastic sheet parts after welding.

2. An apparatus according to claim 1, wherein said cutting means comprise a shaft and a knife device having knives radially movable outwardly when the shaft is rotated in one direction of rotation and radially inwardly when the shaft is rotated in an opposite direction.

3. An apparatus according to claim 1, including engagement means for engaging the wrapped web-shaped material, and wherein one of the engagement means and the closing means provide a relative turning movement between said excess plastic sheet parts and the wrapped rolled-up web-shaped material prior to welding.

4. An apparatus according to claim 2, wherein the engagement means comprise supporting rollers which are positioned in parallel with a longitudinal axis of the core tube.

5. An apparatus according to claim 1, wherein the closing means comprise engagement faces directed toward each other and are retained slidably so that, during movement of the parts in a direction toward each other, the engagement faces define an opening to receive the excess plastic sheet parts.

6. An apparatus according to claim 1, wherein the closing means comprise V-shaped yokes.

7. Use of the apparatus according to claim 1 for plastics sheet wrapping of rolled-up carpet materials.

8. Use of the apparatus according to claim 1 for polyethylene sheet wrapping of web-shaped material rolled up on a core tube of polyethylene.

9. An apparatus according to claim 1, wherein said welding head comprises a cylindrical ultrasonic welding head.

10. An apparatus according to claim 9, wherein said engagement face of said cylindrical ultrasonic welding head is obliquely beveled.

11. A combination of:

(a) a composite product formed of an elongated core tube comprised of a plastic material and a web-shaped material wrapped around said elongated core tube, said core tube having a length substantially equal to a width of said web-shaped material and defining opposite first and second ends in substantial alignment with respective opposite first and second side edges of said web-shaped material, and (b) an apparatus for attaching a plastic sheet which is wrapped around said composite product, such that a first end portion of the plastic sheet extends beyond said first end of said core tube, said apparatus comprising closing means for gripping and gathering said first end portion of said plastic sheet, and welding means for welding said gathered first end portion of said plastic sheet to said first end of said core tube, said welding means including a welding head having an engagement face for engaging the plastic sheet material along one of an inner and outer annular edge of the first end of the core tube, (c) an apparatus wherein cutting means comprise a milling head mounted to be axially slidable in an inward direction toward an interior of the core tube for removing free excess plastic sheet parts after welding.

* * * * *